United States Patent
Park et al.

(10) Patent No.: US 9,185,570 B2
(45) Date of Patent: Nov. 10, 2015

(54) METHOD AND APPARATUS FOR PERFORMING CHANNEL MEASUREMENT IN A DISTRIBUTED MULTI-NODE SYSTEM

(75) Inventors: Sungho Park, Anyang-si (KR); Jinyoung Chun, Anyang-si (KR); Moonil Lee, Anyang-si (KR); Kitae Kim, Anyang-si (KR); Sunam Kim, Anyang-si (KR); Jiwon Kang, Anyang-si (KR); Bin Chul Ihm, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 450 days.

(21) Appl. No.: 13/698,629

(22) PCT Filed: May 18, 2011

(86) PCT No.: PCT/KR2011/003686
§ 371 (c)(1),
(2), (4) Date: Dec. 28, 2012

(87) PCT Pub. No.: WO2011/145886
PCT Pub. Date: Nov. 24, 2011

(65) Prior Publication Data
US 2013/0094384 A1   Apr. 18, 2013

Related U.S. Application Data

(60) Provisional application No. 61/345,613, filed on May 18, 2010, provisional application No. 61/423,059, filed on Dec. 14, 2010.

(51) Int. Cl.
*H04W 24/00* (2009.01)
*H04L 5/00* (2006.01)
*H04L 1/00* (2006.01)
*H04L 1/20* (2006.01)
*H04L 1/06* (2006.01)
*H04B 17/327* (2015.01)

(Continued)

(52) U.S. Cl.
CPC ............ *H04W 24/00* (2013.01); *H04B 17/327* (2015.01); *H04L 1/0026* (2013.01); *H04L 1/06* (2013.01); *H04L 1/20* (2013.01); *H04L 5/0053* (2013.01); *H04B 7/0626* (2013.01); *H04B 17/24* (2015.01)

(58) Field of Classification Search
CPC .... H04B 7/024; H04B 7/0623; H04L 5/0053; H04L 5/0023
See application file for complete search history.

(56) References Cited

U.S. PATENT DOCUMENTS

| 8,208,434 B2* | 6/2012 | Sayana et al. ............. 370/329 |
| 2010/0087151 A1* | 4/2010 | Auer ...................... 455/67.11 |
| 2014/0092862 A1* | 4/2014 | Noh et al. ................ 370/330 |

OTHER PUBLICATIONS

In the PCT International Search Report Application Serial No. PCT/KR2011/003686, dated Jan. 18, 2012, 6 pages.

(Continued)

*Primary Examiner* — Raj Jain
(74) *Attorney, Agent, or Firm* — Lee, Hong, Degerman, Kang & Waimey

(57) ABSTRACT

The present description relates to a method for receiving a reference signal (RS) in a distributed multi-node system, comprising: a step of receiving, from a base station, channel state information reference signal (CSI-RS) configuration information which indicates the configuration of the channel state information reference signal the power of which is non-zero; and a step of receiving a channel state information reference signal for at least one node in a cell on the basis of the channel state information reference signal configuration information, wherein said channel state information reference signal with non-zero power has at least one configuration, and is received via at least one subframe.

14 Claims, 8 Drawing Sheets

(51) Int. Cl.
*H04B 7/06* (2006.01)
*H04B 17/24* (2015.01)

(56) References Cited

OTHER PUBLICATIONS

Andreas F. Molisch and Moe Z. Win, "MIMO systems with antenna selection," IEEE Microwave Magazine, vol. 5, Issue 1, pp. 46-56, Mar. 2004.

Catt, "Consistent design of CSI-RS for FDD and TDD," R1-094137, 3GPP TSG RAN WG1 Meeting #58bis, Oct. 12, 2009.

Zte, "Intra-cell CSI-RS allocation pattern," R1-101827, 3GPP TSG RAN WG1 Meeting #60bis, Apr. 12, 2010.

Alcatel-Lucent Shanghai Bell and Alcatel-Lucent, "Further consideration on CSI-RS," R1-101855, 3GPP TSG RAN WG1 Meeting #60bis, Apr. 12, 2010.

\* cited by examiner

METHOD AND APPARATUS FOR PERFORMING CHANNEL MEASUREMENT IN A DISTRIBUTED MULTI-NODE SYSTEM

CROSS-REFERENCE TO RELATED APPLICATIONS

This application is the National Stage filing under 35 U.S.C. 371 of International Application No. PCT/KR2011/003686, filed on May 18, 2011, which claims the benefit of U.S. Provisional Application No. 61/345,613, filed on May 18, 2010, and U.S. Provisional Application No. 61/423,059, filed on Dec. 14, 2010, the contents of which are all hereby incorporated by reference herein in their entirety.

TECHNICAL FIELD

This disclosure concerns distributed multi-node systems, and particularly to methods of determining a valid node and measuring a channel for a node (or antenna node).

BACKGROUND ART

In current radio communication environments, cellular networks are required to process more and more data as various devices, such as smartphones or tablet PCs, appear and spread, which require a high data transmission rate.

To meet such demand for high data rate, communication technologies are advancing toward carrier aggregation and cognitive radio technologies to effectively utilize more frequency bands and multi-antenna and multi-base station cooperation technologies to raise data capacity in a limited frequency range. Further, the communication environment evolves to have increasing density of nodes to which a user can gain access.

A system with such high density of nodes may exhibit higher system capacity thanks to inter-node cooperation. Such scheme shows much higher capacity than when each node operates as an independent base station (e.g., base station (BS), Advanced BS (ABS), Node-B (NB), eNode-B (eNB), or Access Point (AP)) without cooperation.

DISCLOSURE

Technical Problem

In the case of the existing system (LTE-A Rel-10 or its previous system), nodes managed by a base station or cell have one or more antenna elements, but are locally present at the same position. Accordingly, the number of nodes recognized by the base station or cell is one, and the distinction of the base station or cell and its operation are required while separate distinction of nodes and its operation are not required.

However, in the case of a distributed multi-node system, many nodes may be included in the system, and thus, definition and operations for distinguishing nodes from each other are required.

In existing LTE-A Rel-10, CSI-RS may transmit reference signals for the maximum of 8 ports at the same time. This means that in the distributed multi-node system, a terminal may differentiate up to eight nodes from each other per cell and may perform data transmission/reception on up to eight layers.

However, in case the number of nodes in a cell is 8, a relatively low cell throughput is provided, and it is difficult to achieve effective interference coordination at a cell edge, thus restricting the capacity of the distributed multi-node system.

Although LTE-A Rel-10 CSI-RS may transmit CSI-RS through a multiple subframe offset with respect to five duty cycles, in the subframe configuration confined in the corresponding duty cycle (for example, in case of 5 ms duty cycle, 5 subframes=8 nodes (or 8 antenna elements)*5=40 nodes (or 40 antenna elements)), the resolution for a node or the antenna element resolution for all the nodes may be insufficient when multiple nodes are arranged in the distributed multi-node system.

Accordingly, this disclosure aims to provide a method of configuring a plurality of CSI-RSs and transmitting the CSI-RSs in order to distinguish at least one node from others in the distributed multi-node system.

Further, this disclosure aims to provide a method of transmitting control information so as to distinguish at least one antenna node from others in the distributed multi-node system.

Technical Solution

In this disclosure, a method of receiving a reference signal (RS) in a distributed multi-node system includes the steps of receiving channel state information reference signal configuration information from a base station, wherein the channel state information reference signal configuration information indicates a non-zero power configuration of a channel state information reference signal (CSI-RS) and receiving a channel state information reference signal on at least one node in a cell based on the channel state information reference signal configuration information, wherein the non-zero power channel state information reference signal has at least one configuration and is received through at least one subframe.

In a case where the non-zero power CSI-RS is received through at least two subframes, the non-zero power CSI-RS is received at a predetermined frame offset interval or at an integer-multiple duty cycle interval based on the first received subframe.

The method further includes the step of receiving from the base station CSI-RS type indication information that indicates whether the CSI-RS is for channel state information (CSI) feedback or for node information feedback.

Node distinction using the CSI-RS is performed by additionally using node distinction information upon generation of a CSI-RS sequence, wherein the node distinction information includes a node index, a port number or a virtual cell ID.

The CSI-RS sequence uses different sets depending on a purpose of the CSI-RS.

The method further includes the steps of, in a case where the CSI-RS is for channel state information feedback, performing channel measurement on the at least one node through the received channel state information reference signal, and feeding back to the base station the channel state information on the at least one node.

The method further includes the steps of, in a case where the CSI-RS is for node information feedback, performing measurement on RSSI, RSRP, or RSRQ through the received channel state information reference signal and feeding back to the base station node information for selecting the at least one node.

The channel state information or the node information is fed back for all or each of frequency bands.

The channel state information or the node information is fed back for each or a combination of the at least one node.

The node information includes at least one of a cell ID, antenna port information, a CSI-RS configuration, a CSI-RS subframe configuration, node configuration information, CSI for a node and a node index.

The CSI-RS configuration information further includes information on the maximum number of configurations that may be owned by the CSI-RS in one subframe.

The information on the maximum number of the configurations is determined by at least one of an antenna port, a cyclic prefix (CP) type, and a frame structure type.

The CSI-RS configuration information further includes UE-specific CSI-RS port mapping information.

The method further includes the step of receiving from the base station CSI-RS resource element power information that is defined as a ratio of per-PDSCH resource element energy (EPRE) to per-CSI-RS resource element energy (EPRE), wherein the power information is a UE-specific value.

In this disclosure, a method of performing channel measurement on an antenna node in a distributed multi-node system (DMNS) includes the steps of receiving antenna node control information from the base station, wherein the antenna node control information indicates a per-terminal use static of an antenna node supported by the base station, determining at least one valid antenna node based on the received antenna node control information, and performing channel measurement on the determined at least one valid antenna node.

The method further includes the step of transmitting to the base station at least one of channel state information and antenna node information on each valid antenna for the determined at least one valid antenna node and/or on a valid antenna node combination.

The channel state information includes a channel quality indicator (CQI), a PMI (Precoding Matrix Index), an RI (Rank Indication) or a received signal-to-noise ratio (SINR), wherein the antenna node information includes at least one of a cell ID, antenna port information, a CSI-RS configuration, a CSI-RS subframe configuration, CSI for an antenna node and an antenna node index.

The antenna node control information includes at least one of information on a per-terminal antenna node mean occupation ratio, a probability that antenna node is to be selected or information on a weight value corresponding to the probability, information on a loading margin that represents a margin of occupation of a current antenna node respective of the maximum number of shared terminals, information on whether to use an antenna node, and information on whether to be able to use an antenna node.

The antenna node control information is transmitted in a broadcast or unicast scheme from the base station.

The information on the per-terminal antenna node mean occupation ratio is a predefined lookup table value or an index value of the lookup table.

The information on whether to be able to use the antenna node is configured in the form of a bitmap. In this disclosure, a method of performing channel measurement on an antenna node in a distributed multi-node system (DMNS) includes the steps of determining a valid antenna node on all or each of terminals based on antenna node control information that indicates a per-terminal use statistic of an antenna node, transmitting the determined valid antenna node information to a terminal, and receiving from the terminal channel state information (CSI) for the determined valid antenna node.

In this disclosure, a terminal for performing channel measurement using a reference signal (RS) in a distributed multi-node system includes a radio frequency unit for transmitting and receiving a radio signal to/from an outside and a controller connected to the radio frequency unit, wherein the controller controls the radio frequency unit so that channel state information reference signal (CSI-RS) configuration information is received from a base station, wherein the CSI-RS configuration information indicates a configuration of a non-zero power CSI-RS, and controls the radio frequency unit so that based on the CSI-RS configuration information, a CSI-RS for at least one node in a cell is received, wherein the non-zero power CSI-RS has at least one configuration, and is received through one subframe or a plurality of subframes.

Advantageous Effects

In this disclosure, CSI-RSs are defined which has a number of configurations and whose power is not 0, so that although many nodes are included in the distributed multi-node system, a high cell throughput may be provided and effective interference coordination may be achieved at a cell edge.

Further, in this disclosure, complexity in node detection-based implementation may be reduced by CSI-RS transmission for node detection.

Still further, in this disclosure, time taken to determine a valid antenna for each antenna node of a terminal or base station and calculation overhead may be reduced through control information transmission for determining a valid antenna node.

BEST MODE

Figure 1:
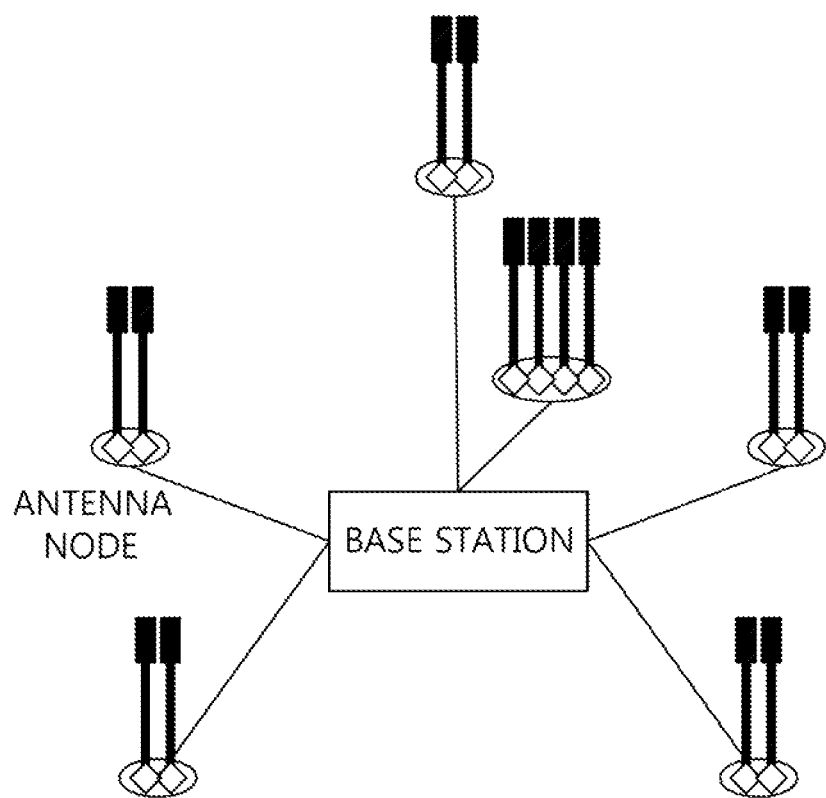
FIGS. 1 and 2 are conceptual views illustrating a distributed multi-node system according to an embodiment of this disclosure.

Hereinafter, embodiments of this disclosure will be described in detail with reference to the drawings. In the description below, what is necessary for understanding of this disclosure is only described, and unnecessary description is skipped which may make the gist of this disclosure unclear.

In the following embodiments, the components or features of this disclosure are combined with each other in predetermined forms. Each component or feature, unless clearly stated otherwise, should be considered to be optional. Each component or feature may be embodied without being combined with another component or feature. Further, some components and/or features may be combined to constitute some embodiments of this disclosure. The order of the operations described in the embodiments may be changed. In an embodiment, some components or features may be included in another embodiment, or may be replaced by components or features that constitute the other embodiment.

In this disclosure, the description on the embodiments focuses on the transmission/reception relationship between a base station and a terminal. Here, the base station means a terminal node of a network which directly communicates with the terminal. In this disclosure, a specific operation which is described to be performed by the base station may be, in some cases, conducted by an upper node of the base station as well.

That is, it is obvious that various operations performed through communication with the terminal over a network constituted of a number of network nodes may be done by the base station or other network nodes than the base station. The 'base station' may be replaced with other terms, such as 'fixed station', 'Node B', 'eNode B (eNB)', or 'access point'. Further, the 'terminal' may be replaced with other terms, such as 'UE (User Equipment)', MS (Mobile Station)', or MSS (Mobile Subscriber Station).

In this disclosure, the embodiments may be implemented by various means, such as, for example, in hardware, firmware, software, or a combination thereof.

When implemented in hardware, the methods according to the embodiments of this disclosure may be implemented as one or more ASICs (application specific integrated circuits), DSPs (digital signal processors), DSPDs (digital signal processing devices), PLDs (programmable logic devices), FPGAs (field programmable gate arrays), processors, controllers, micro controllers, or micro processors.

When implemented in firmware or software, the methods according to the embodiments of this disclosure may be embodied in the form of modules, procedures, or functions, which perform the above-described functions or operations. The software codes may be stored in a memory unit and driven by a processor. The memory unit is positioned in or outside the processor, and may communicate data with the processor by known various means.

The specific terms used herein are provided for better understanding of this disclosure, and such terms may be changed to others without departing from the technical spirit of this disclosure.

Hereinafter, the distributed multi-node system (DMNS) is briefly described.

Distributed Multi-Node System (DMNS)

Figure 2:
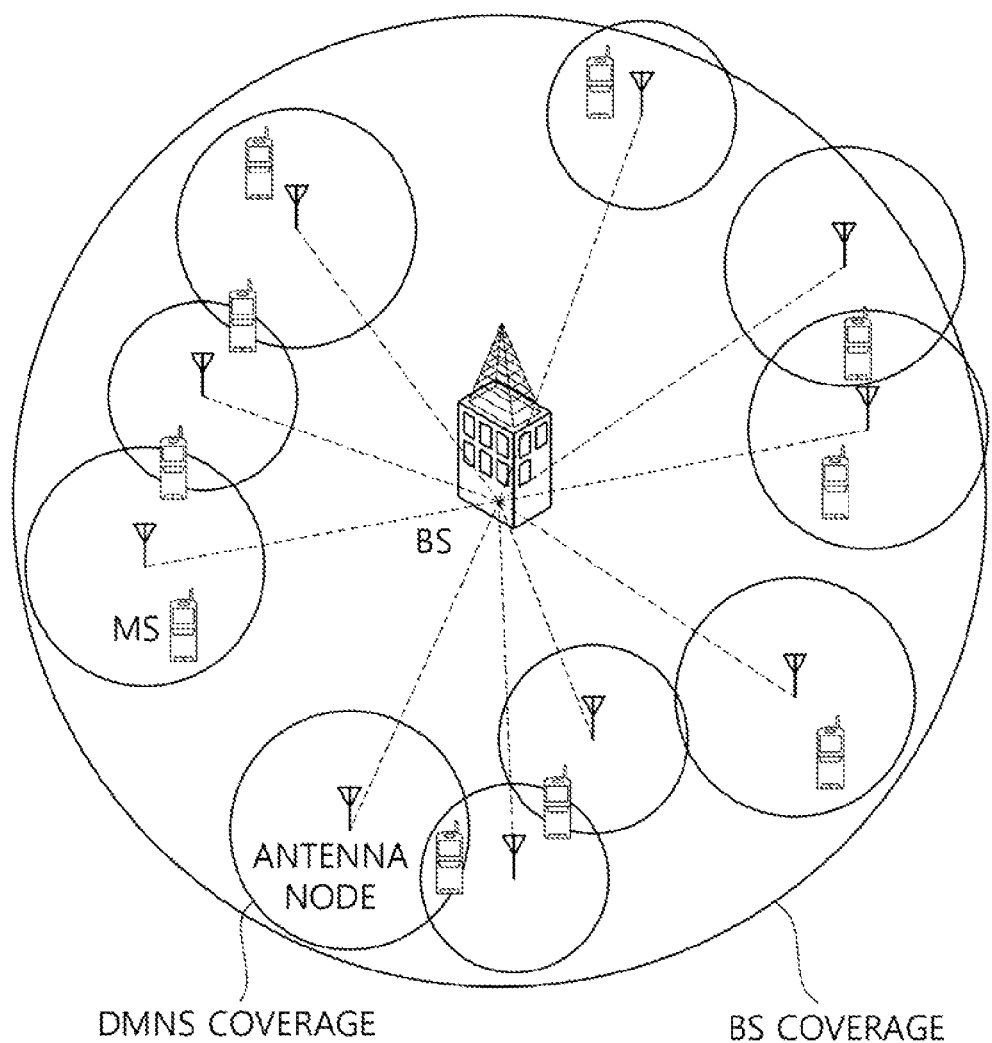

FIGS. 1 and 2 are conceptual views illustrating a distributed multi-node system according to an embodiment of this disclosure.

As shown in FIGS. 1 and 2, the distributed multi-node system may include a base station and at least one antenna node.

The distributed multi-node system (DMNS) means a system that manages antenna nodes (or nodes) dispersed at various positions in a cell by a single base station unlike a centralized antenna system (CAS) in which base station (BS, BTS, Node-B, eNode-B) antennas concentrate on the center of the cell.

The antenna node is wiredly or wirelessly connected to the base station and may include one or more antennas. In general, antennas belonging to one antenna node are locally within the same spot, with the antennas closest to each other apart from each other by a few meters. The antenna node serves as an access point to which the terminal may access.

Here, the antenna node may mean a group of antenna elements disposed in the same area. That is, the CAS has one antenna node, and the DMNS has one or more antenna nodes.

Further, the antenna node may be used to have the same meaning as 'node', 'antenna port (or element) group', 'antenna port', 'distributed antenna unit (DA)', 'antenna group', 'antenna cluster', 'base station (BS)', 'Node-B', 'eNode-B', 'pico-cell eNB (PeNB)', 'home eNB (HeNB)', 'RRH', 'relay', or 'repeater'.

Referring to FIGS. 1 and 2, all the antenna nodes are managed by one controller in light of transmission/reception, so that each individual antenna node may operate as a group of some antennas of one cell. At this time, the individual antenna node may be assigned a separate Node ID or may operate as a group of some antennas in the cell without a separate Node ID.

Further, if an individual antenna node performs scheduling and handover with a separate cell identifier (ID), this may be deemed a multi-cell system (as an example, macro-/femto-/pico-cell).

Further, if these multi-cells are configured to overlap each other according to coverage, this is referred to as 'multi-tier network'.

Hereinafter, reference signals (RSs) are briefly described.

The reference signals include common reference signals (CRSs), dedicated reference signals (DRSs), and channel state information (or indication) reference signals (CSI-RSs).

Common Reference Signal (CRS)

CRSs are used for estimating a channel at the physical antenna terminal, and are reference signals that may be commonly received by all the terminals (UEs) and distributed over the entire band. CRSs may be used for purposes of obtaining channel state information (CSI) and data demodulation.

Various types of CRSs are defined depending on the antenna configuration at the side of transmission (base station). The 3GPP LTE (Release-8) system supports various antenna configurations and has three types of antenna configurations, such as a single antenna, two transmission antennas, and four transmission antennas, at the downlink signal transmission side (base station). In case the base station conducts single antenna transmission, a reference signal for the single antenna port is arranged. In case the base station performs two-antenna transmission, reference signals for two antenna ports are arranged in the time division multiplexing scheme and/or in the frequency division multiplexing scheme. That is, the reference signals for two antenna ports are arranged to different time resources and/or different frequency resources so that they may be distinguished from each other. Further, in case the base station performs four-antenna transmission, reference signals for four antenna ports are arranged in TDM/FDM schemes. The channel information estimated by the downlink signal reception side (terminal) through the CRS may be used for demodulation of data transmitted in the transmission schemes, such as single antenna transmission, transmit diversity, closed-loop spatial multiplexing, or open-loop spatial multiplexing, multi-user MIMO (MU-MIMO).

In the case of supporting multi-antenna, when some antenna port transmits a reference signal, the reference signal is transmitted to a resource element (RE) position designated according to a reference signal pattern while no signals are transmitted to a resource element (RE) position designated for other antenna ports.

To increase channel estimation capacity through CRS, the position of CRS in the frequency domain may be shifted per cell, so that it may be used in different ways. For example, in case reference signals are positioned every three subcarriers, some cells may be arranged on a subcarrier of 3k or other cells on a subcarrier of 3k+1. In light of one antenna port, the reference signals are arranged at the interval of 6 Res (i.e., interval of 6 subcarriers) in the frequency domain, while maintaining in the frequency domain a 3 RE interval from REs where reference signals for other antenna ports are arranged.

Further, CRS is arranged differently depending on the length of CP (normal CP, extended CP).

Dedicated Reference Signal (DRS)

In a system having an expanded antenna configuration to reduce overhead of reference signal, introduction to UE-specific reference signals, i.e., dedicated reference signals (DRSs) may be considered to support data transmission through added antennas.

In designing DRSs for new antenna ports, the pattern of CRS, and the frequency shift and power boosting of CRS need to be considered. Specifically, to raise channel estimation capacity by CRS, the frequency shift and power boosting of CRS are considered. As described earlier, the frequency shift means setting different start points to CRS per cell. The power boosting means fetching power from REs other than REs assigned for reference signal among REs in one OFDM symbol. Meanwhile, DRS may be designed to have a different frequency interval from CRS, and in case DRS is present in the same OFDM symbol as CRS, DRS may overlap CRS in light of position according to the above-described frequency shift of CRS, and the power boosting of CRS may negatively affect transmission of DRS.

Further, since DRS is a reference signal for data demodulation, it is positioned an area where data channel is assigned.

Channel State Information Reference Signal (CSI-RS)

In a system having an expanded antenna configuration (for example, LTE-A system supporting 8 transmission antennas) compared with a system having an existing antenna configuration (for example, LTE release 8 system supporting 4 transmission antennas), a new reference signal is required to be transmitted to obtain channel state information (CSI).

Compared with channel information required for data demodulation, in the case of channel information for obtaining CSI, although accuracy of channel estimation through reference signals is relatively low, it is enough to obtain CSI. Accordingly, a reference signal (CSI-RS) designed to obtain CSI may be designed to have relatively low density compared with the existing reference signal. For example, CSI-RS may be transmitted at a duty cycle of 2 ms, 5 ms, 10 ms, or 40 ms over time, and RS having an interval of 6 REs or 12 REs may be transmitted over frequency. Here, the duty cycle means time unit in which all the reference signals for the antenna ports used for transmission may be obtained. Further, CSI-RS may be transmitted over the entire band over frequency.

To reduce overhead of CSI-RS transmitted in one subframe, the reference signal for each antenna port may be transmitted over a different subframe. However, CSI-RS that may support all the antenna ports according to the expanded antenna in the duty cycle should be transmitted.

Hereinafter, channel state information reference signal (CSI-RS) is described in greater detail.

1. Multiple Configurations

Unlike CRS, for CSI-RS, up to 32 different configurations have been suggested to reduce inter-cell interference (ICI) in the multi-cell environment including a hetero network (Het-Net) environment.

Configurations for CSI-RS vary depending on the number of antenna ports in the cell, and are made as different as possible between neighboring cells. Further, these are distinguished depending on the type of cyclic prefix (CP), and are divided into a case that applies to both FS1 and FS2 and a case that applies to FS2 only depending on the type of frame structure (FS). Finally, unlike CRS, CSI-RS supports the maximum of 8 ports (p=15, p=15, 16, p=15, . . . , 18 and p≤15, . . . 22) and is defined only for $\Delta f=15$ kHz.

The following Table 1 shows an example of CSI-RS configuration for Normal CP:

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

The following Table 2 shows an example of CSI-RS configuration for extended CP:

TABLE 2

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 | | | | | | |
| 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| Frame structure type 2 only | | | | | | |
| 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

2. Resource Mapping

In the subframe configured for CSI-RS transmission, reference signal (RS) sequence $r_{l,n_s}^{(m)}$ mapped with complex-valued modulation symbol $a_{k,l}^{(p)}$ used as a reference symbol for antenna port p according to Equation 1:

$$a_{k,l}^{(p)} = w_{l''} \cdot r(m)$$ [Equation 1]

where, $k = k' + 12m +$ $$\begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = \begin{cases} l'' & \text{CSI reference signal configurations 0 – 19, normal cyclic prefix} \\ 2l'' & \text{CSI reference signal configurations 20 – 31, normal cyclic prefix} \\ l'' & \text{CSI reference signal configurations 0 – 27, extended cyclic prefix} \end{cases}$$

$$l'' = \begin{cases} 1 & p \in \{15, 17, 19, 21\} \\ (-1)^{l''} & p \in \{16, 18, 20, 22\} \end{cases}$$

$l'' = 0, 1$ $m = 0, 1, \ldots, N_{RB}^{DL} - 1$ $$m' = m + \left\lfloor \frac{N_{RB}^{max,DL} - N_{RB}^{DL}}{2} \right\rfloor$$

It is usable in the cell given with multi-configuration CSI-RS.

First, in the case of CSI-RS whose power is not 0 (non-zero power CSI-RS), the base station transmits only CSI-RS for one configuration to the terminal.

Further, in the case of CSI-RS whose power is 0 (zero power CSI-RS), the base station may transmit CSI-RS for multi-configuration to the terminal. Further, the base station may not transmit the CSI-RS to the terminal.

Here, in the following cases, the base station does not transmit CSI-RS:

1) specific subframe of FS2

2) in case of colliding with synchronization signals, PBCH, or SIB (System Information Block) 1

3) subframe where paging message is transmitted

With respect to resource element (RE) (k,l) used for transmission of CSI-RS in some of antenna ports of set S, none of antenna ports in the same slot are used for transmission of PDSCH, and except for the elements of set S in the same slot, none of the antenna ports are used for CSI-RS.

3. Subframe Configuration

CSI-RS supports five duty cycles depending on CQI/CSI feedback and may be transmitted with different subframe offsets in each cell.

(1) cell-specific subframe configuration period: $T_{CSI-RS}$ (2) cell-specific subframe offset: $\Delta_{CSI-RS}$ (3) CSI-RS-SubframeConfig: provided by higher layer (4) subframe including CSI-RS should satisfy Equation 2:

$$(10n_f + \lfloor n_s/2 \rfloor - \Delta_{CSI-RS}) \bmod T_{CSI-RS} = 0 \quad \text{[Equation 2]}$$

The following Table 3 shows an example of CSI-RS subframe configuration relating with duty cycle:

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

4. Sequence Generation

Sequence $r_{l,n_s}(m)$ for CSI-RS is generated as in Equation 3:

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 3]}$$

$$m = 0, \ldots, N_{RB}^{max,DL} - 1$$

where, $$c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$$

$$N_{CP} = \begin{cases} 1 & \text{for normal } CP \\ 0 & \text{for extended } CP \end{cases}$$

5. Definition of CSI-RS

CSI-RS-related parameters are cell-specific and are configured through higher layer signaling.

(1) Number of CSI-RS ports (2) CSI-RS configuration (3) Configuration of CSI-RS subframe ($I_{CSI-RS}$)

(4) Period of subframe configuration ($T_{CSI-RS}$)

(5) Subframe offset ($\Delta_{CSI-RS}$)

Terminal estimates reference PDSCH transmission power for CSI feedback $P_c$.

$P_c$ is an estimation ratio of PDSCH EPRE and CSI-RS EPRE when the terminal performs CSI feedback, and has values whose interval is 1 dB within a range of [−8, 15] dB.

Here, EPRE (Energy Per Resource Element) represents energy per resource element, and means transmission power or energy for resource element mapped with a data symbol or reference symbol.

The following Table 4 shows an example of the number of intra-cell CSI-RS configurations according to the number of antenna ports and frame structure type, and CP type in LTE-A Rel-10:

TABLE 4

| CP Type | Frame Structure | Number of CSI-RS configurations | | |
|---|---|---|---|---|
| | | 2 ports CSI_RS | 4 ports CSI_RS | 8 ports CSI_RS |
| Normal CP | Type1&2 | 20 | 10 | 5 |
| | Type2 | 12 | 6 | 3 |
| | Total | 32 | 16 | 8 |
| Extended CP | Type1&2 | 16 | 8 | 4 |
| | Type2 | 12 | 6 | 3 |
| | Total | 28 | 14 | 7 |

First Embodiment

Hereinafter, CSI-RS configuration and transmission scheme for channel measurement and node detection in the distributed multi-node system (DMNS) as suggested herein are described in detail.

Intra-Cell Non-Zero Power CSI-RS having Multiple Configurations

First, a number of (or multiple) CSI-RS configurations are suggested whose intra-cell power is not 0 in the distributed multi-node system (DMNS) according to an embodiment of this disclosure.

That is, in the cases of CSI-RS which has multiple configurations and whose power is not 0 (non-zero power CSI-RS) as well as CSI-RS which has multiple configurations and whose power is 0 in the distributed multi-node system (DMNS), a method of transmitting it to the terminal through various configurations is provided.

Figure 3:
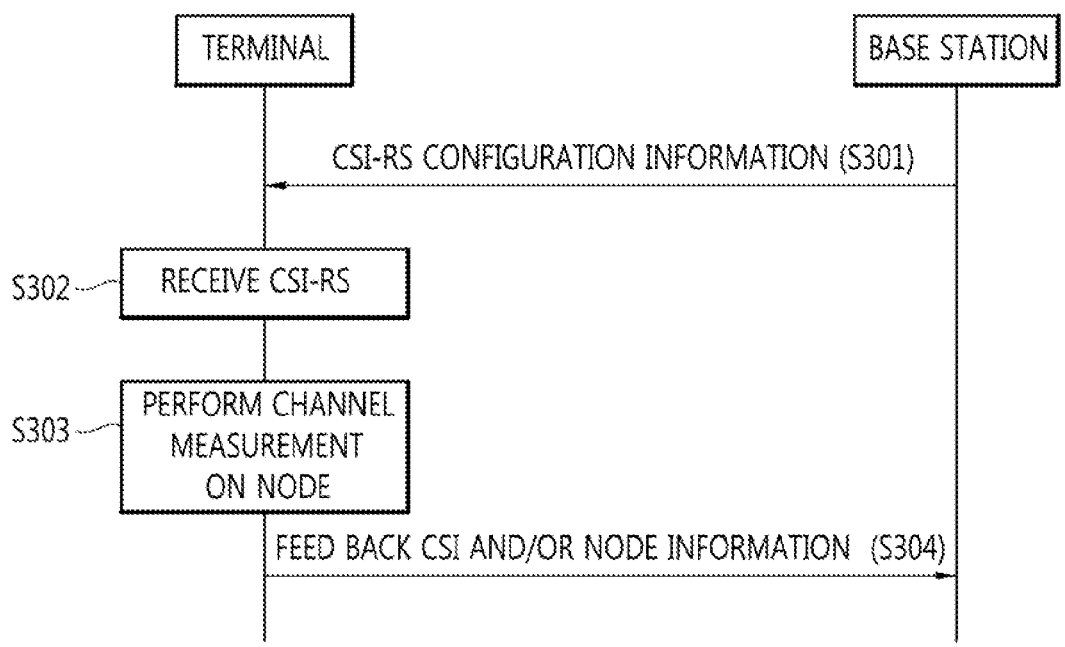
FIG. 3 is a flowchart illustrating a method of transmitting CSI-RS according to an embodiment of this disclosure.

FIG. 3 is a flowchart illustrating a method of transmitting CSI-RS according to an embodiment of this disclosure.

The base station transmits CSI-RS configuration information showing the configuration of non-zero power CSI-RS to the terminal (S301). Here, the CSI-RS configuration information refers to control information relating to CSI-RS representing various configurations of non-zero power CSI-RS. Further, the CSI-RS configuration information is transmitted from the base station to the terminal through higher layer signaling in a cell-specific manner.

Hereinafter, CSI-RS-related control information in LTE-A Rel-10, that is, parameters (1) to (7), is briefly described. Likewise, the CSI-RS parameters are transmitted to the terminal through higher layer signaling in a cell-specific manner:

(1) Number of CSI-RS ports (2) Number of CSI-RS Configurations (3) Configuration of CSI-RS subframe ($I_{CSI\_RS}$)

(4) Subframe configuration period: $T_{CSI-RS}$ (5) Ssubframe offset: $\Delta_{CSI-RS}$ (6) Ratio of PDSCH EPRE to CSI-RS EPRE: $P_c$ (7) Zero power CSI-RS configuration First, parameters (1) and (2) are parameters regarding the configuration of intra-cell CSI-RS in the subframe, and the base station transmits to the terminal the number of CSI-RS ports through 2 bits size of parameter (1) and CSI-RS configuration at the corresponding number of ports through 5 bits size of parameter (2).

Parameters (3) to (5) are parameters regarding the configuration of CSI-RS subframe and include what is disclosed in Table 3:

The base station transmits the position of CSI-RS transmitted through $I_{CSI-RS}$ of parameter (3) and the duty cycle to the terminal.

Parameter (6) represents a power ratio of PDSCH resource element (RE) to CSI-RS RE, and the base station allows the terminal to estimate relative power of PDSCH with respect to CSI-RS through parameter (6).

Here, EPRE represents energy per resource element (hereinafter, "EPRE"), and this means energy or transmission power for a resource element mapped with one reference symbol or data symbol.

Parameter (7) is a zero power CSI-RS configuration bitmap constituted of 16 bits based on 4 ports CSI-RS configuration, and the base station allows the terminal to, through parameter (7), grasp the position (muted RE) where CSI-RS is not actually present but data is not transmitted and to perform rate matching on it.

Non-Zero Power CSI-RS having Multiple Configurations in One Subframe

As an example of this disclosure, the CSI-RS configuration information may represent non-zero CSI-RS configuration having multiple configurations in one subframe.

In such case, the base station, with respect to parameters (1) and (2) (i.e., number of CSI-RS ports and number of CSI-RS configurations), the base station may make configurations to include 1) both cell-specific CSI-RS and node-specific CSI-RS, 2) only cell-specific CSI-RS, or 3) only node-specific CSI-RS, and may then transmit it to the terminal. Here, the cell-specific CSI-RS may be configured by the following method.

First, it is configured to be transmitted to both a terminal supporting the distributed multi-node system and an LTE-A Rel-10 terminal.

Second, it is configured so that multiple non-zero power CSI-RSs are transmitted to only the terminal supporting the distributed multi-node system by way of broadcast o unicast.

Here, in the first case for the cell-specific CSI-RS configuration, as CSI-RS in the existing LTE-A Rel-10, signaling from the base station to the terminal is the same as in the existing LTE-A Rel-10. In such case, the LTE-A Rel-10 terminal may maintain the existing operation as is. However, for the terminal supporting the distributed multi-node system, the base station may separately signal the terminal with control information for node-specific CSI-RS. In such case, to have full resolution for all the nodes in the cell, the terminal preferably transmits each of feedbacks for cell-specific CSI-RS and node-specific CSI-RS to the base station.

In the second case for the cell-specific CSI-RS configuration, the cell-specific CSI-RS may perform reception only from the terminal supporting the distributed multi-node system, and performs signaling to the terminal separately from signaling for CSI-RS in the existing LTE-A Rel-10.

Here, the control information for node-specific CSI-RS is transmitted targeting only the terminal supporting the distributed multi-node system.

Further, parameter (1), that is, number of CSI-RS ports, may apply the same number to the cell-specific CSI-RS and the node-specific CSI-RS. In such case, parameter (1) may be transmitted as only one value.

Further, parameter (2), that is, number of CSI-RS configurations, may be transmitted to the terminal in the multiple (or multi) CSI-RS configuration indexes form or in the CSI-RS configuration bitmap form.

Here, the multiple (or multi) CSI-RS configuration index form may use the 5-bit form regarding the number of CSI-RS configurations in the existing LTE-A Rel-10.

Further, the CSI-RS configuration bitmap form indicates the CSI-RS configuration assigned by using total 32 bits of bitmap on the basis of 1 and 2 ports CSI-RS configuration, and this may be transmitted to the terminal.

Further, as another example of this disclosure, in the case of DMNS that may perform joint transmission on a plurality of nodes, it may be assumed that considering transmission to the base station and feedback overhead, a single stream is transmitted for each of the remaining nodes except for the centre node or per node.

Accordingly, the mapping relationship between the antenna port and the node for CSI-RS transmitted from the base station to the terminal may follow the below scheme:

First, CSI-RS port is mapped to node.

Second, CSI-RS port is mapped to antenna element.

Finally, some ports of CSI-RS are mapped to node, and others are mapped to antenna element.

Here, in the first case where the CSI-RS port is mapped to node, the base station informs the terminal of the number of antenna elements per node through separate signaling.

Multiple Non-Zero CSI-RS Configurations in Multiple Subframes

As another example of this disclosure, the CSI-RS configuration information may represent multiple non-zero power CSI-RS configurations in multiple subframes.

In the existing LTE-A Rel-10, CSI-RS may be transmitted at five different duty cycles, with various subframe configurations ($I_{CSI-RS}$) provided for each duty cycle. However, in LTE-A Rel-10, non-zero power CSI-RS has only one subframe configuration in one subframe. This is suggested to minimize CSI-RS collision in the network environment where a plurality of cells and nodes overlap each other or are adjacent to each other although up to 32 configurations orthogonal to each other in the time/frequency domain are provided in one subframe. However, since in the distributed multi-node system a plurality of nodes are provided in the intra-cell, the number of ports that may be simultaneously transmitted in one subframe of CSI-RS may be insufficient.

Accordingly, the base station is defined to be able to transmit multiple configurations to the terminal through at least one subframe for non-zero CSI-RS in the intra-cell.

For example, when transmitting CSI-RS of a total of 20 ports, CSI-RSs of 8, 8, and 4 ports may be sequentially transmitted through the subframe of $I_{CSI-RS}=0$ (1st subframe), the subframe of $I_{CSI-RS}=1$ (2nd subframe), and the subframe of $I_{CSI-R}=3$ (3rd subframe). That is, the base station transmits a number of CSI-RS configurations to the terminal through the following schemes with respect to parameters (3) to (5) (i.e., $I_{CSI-RS}$, $T_{CSI-RS}$, $\Delta_{CSI-RS}$).

First, in one or more CSI-RS subframes transmitting one CSI-RS, signaling is independently done for at least one parameter per subframe.

That is, in the first scheme, one CSI-RS transmitted through one or more CSI-RS subframes may be transmitted with the same $T_{CSI-RS}$ and different $I_{CSI-RS}$ per subframe (that is, same duty cycle, different subframe configuration).

Or, it may be transmitted with different $T_{CSI-RS}$ and different $I_{CSI-RS}$ (that is, different duty cycle, different subframe configuration).

Second, in one or more CSI-RS subframes transmitting one CSI-RS, the rest of the CSI-RSs are transmitted with sequential subframe offsets ($\Delta'_{CSI-RS}$) with respect to the first subframe.

That is, in the case of the second scheme, for $\Delta_{CSI-RS}$ ($=I_{CSI-RS}$) ($\Delta'_{CSI-RS}=0$) in the subframe of $I_{CSI-RS}=0$ ($1^{st}$ subframe), in the second subframe, CSI-RS may be transmitted with the subframe offset of $\Delta'_{CSI-RS}=\Delta_{CSI-RS}+1$, and in the third subframe, CSI-RS may be transmitted with the subframe offset of $\Delta'_{CSI-RS}=\Delta_{CSI-RS}+2$. Or, it may be assigned at the same interval within $T_{CSI-RS}$ for $I_{CSI-RS}$ in the first subframe.

Also, the base station may not perform separate transmission to the terminal other than transmission of information regarding the first subframe. In such case, the number of subframes where CSI-RS is transmitted should be separately indicated.

Finally, in one or more CSI-RS subframes transmitting one CSI-RS, transmission is done with duty cycle ($T_{CSI-RS}$) of n times (n=1, 2, . . . , N) of $T_{CSI-RS}$ of CSI-RS subframe. That is, at this time, the actual duty cycle of CSI-RS subframe becomes $N*^T_{CSI-RS}$.

Here, N is the number of CSI-RS subframes.

That is, in the third scheme, in case the first subframe configuration $I_{CSI-RS}$ for CSI-RS is 0 and $T_{CSI-RS}$ is 5, CSI-RS is sequentially transmitted through the subframe of $I_{CSI-RS}$=0, the subframe of $I_{CSI-RS}$=5, and the subframe of $I_{CSI-RS}$=10. That is, CSI-RS is transmitted through the duty cycle and subframe configuration of n times (n=0, 1, 2, . . . , N where N: number of CSI-RS subframes) of $T_{CSI-RS}$ for the first subframe.

Here, the base station may transmit non-zero power CSI-RS having multiple configurations in multiple subframes to the terminal supporting the DMNS in a multicast or unicast scheme.

UE-Specific $P_c$ Transmission

As still another example of this disclosure, the base station transmits $P_c$ UE-specifically.

Here, $P_c$ is a power ratio of PDSCH EPRE to CSI-RS EPRE, and resulantly indicates power of CSI-RS RE. This was de facto a cell-specific value because the existing CSI-RS has a cell-specific configuration. However, in the case of DMNS, a different serving node may be provided per terminal—that is, a different CSI-RS configuration is provided for each terminal—and thus, the base station transmits different $P_c$'s per terminal.

Accordingly, in the distributed multi-node system, the base station transmits UE-specific $P_c$, and the terminal may perform exact channel estimation through it.

UE-Specific zero CSI-RS Configuration Transmission

As still another example of this disclosure, the base station UE-specifically transmits zero power CSI-RS configuration to the terminal.

Here, the zero power CSI-RS configuration, as described in connection with parameter (7), means bitmap information for REs that do not have transmission power but are reserved according to CSI-RS configuration.

In LTE-A Rel-10, terminal may recognize that corresponding REs may not become data based on parameter (7) and may enhance transmission efficiency by performing rate matching on it. Although zero power CSI-RS configuration may be configured independently from non-zero power CSI-RS configuration, CSI-RS is cell-specific, and thus, zero power CSI-RS configuration is cell-specific information as well.

However, since in the case of distributed multi-node system multiple configurations and/or various configurations may be provided per terminal, an independent zero power CSI-RS configuration should be provided per terminal.

This may use 16 bits bitmap based on 4 ports CSI-RS configuration like existing LTE-A Rel-10 CSI-RS, but in the case of distributed multi-node system having multi-node, it is preferable to use 32 bits bitmap based on 1 and 2 ports CSI-RS configurations to secure node resolution.

Further, the base station preferably performs transmission to the terminal through a different configuration (32, 16, 8 bit bitmap for 2, 4, 8 ports CSI-RS configuration respectively) per CSI-RS, per UE.

Information on the Maximum Number of Configurations in One Subframe of Non-Zero CSI-RS As still another example of this disclosure, the base station transmits to the terminal information on the maximum number of configurations that may be owned by inter-cell non-zero power CSI-RS in one subframe.

In the distributed multi-node system, base station may transmit CSI-RS having multiple configurations to terminal in one or more subframes. In such case, if the number of nodes in the cell increases, a number of CSI-RSs are present for the DMNS, which leads to high probability of collision with CSI-RS from the base station in LTE-A Rel-10 of a neighbor cell, thereby resulting in a deterioration of capacity. This conflicts with the design criteria of CSI-RS multiple configurations so as to reduce CSI-RS collision probability for a number of inner-cells or neighbor cells.

Accordingly, to address such problem, the base station defines the maximum number of non-zero power eCSI-RS configurations assignable in one cell depending on port, CP type, or frame structure type.

The following Table 5 shows an example of the number of maximally allowable configurations of non-zero power eCSI-RS that may be simultaneously assigned in one cell:

TABLE 5

| CP Type | Frame Structure | Number of available multiple eCSI-RS configurations ($N_{MaxNumberofeCSI-RSconfig}$) | | |
|---|---|---|---|---|
| | | 2 ports CSI_RS | 4 ports CSI_RS | 8 ports CSI_RS |
| Normal CP | Type1&2 | 10 | 5 | 4 |
| | Type2 | 6 | 3 | 1 |
| | Total | 16 | 8 | 5 |
| Extended CP | Type1&2 | 8 | 4 | 2 |
| | Type2 | 6 | 3 | 1 |
| | Total | 14 | 7 | 3 |

That is, in DMNS, the base station transmits information ($N_{MaxNumberofeCSI-RSconfig}$) on the maximum number of eCSI-RS configurations available in one cell to the terminal.

CSI-RS Type Indicator Transmission

As yet still another example of this disclosure, the base station transmits to the terminal CSI-RS type indicator indicating the purpose of CSI-RS.

That is, the CSI-RS indicator is indication information that indicates whether CSI-RS transmitted from the base station to the terminal is 1) for CSI feedback or 2) for node information feedback.

That is, the base station may transmit CSI-RS to the terminal for two measurements 1) or 2). The base station may transmit CSI-RSs having different periodicities to the terminal depending on the feedback type of the terminal (or CSI-RS purpose).

Further, the CSI-RS type indicator may be transmitted to the terminal in a cell-specific or UE-specific manner.

In such case, the base station may generate the CSI-RS sequence using different cell IDs depending on CSI-RS purpose.

That is, the base station generates the CSI-RS sequence using different cell ID subsets according to the terminal feedback type (or CSI-RS purpose).

Here, the cell ID means an identifier for a node, which applies to CSI-RS sequence generation, but unlike PCI (Physical Cell Identifier), does not apply to CRS sequence generation or an identifier for simply distinguishing nodes from each other.

UE-Specific CSI-RS Port Mapping Information Transmission

As yet still another example of this disclosure, the base station may transmit UE-specific CSI-RS port mapping information to the terminal in relation with CSI-RS transmission.

In transmitting CSI-RS, the base station may transmit cell-specific

CSI-RS to the terminal. In such case, one or more terminal CSI-RSs may be included in one CSI-RS configuration. At this time, the terminal may read only the CSI-RS corresponding to the terminal depending on the UE-specific CSI-RS port mapping information.

Terminal's Channel Measurement through CSI-RS

The terminal receives the CSI-RS configuration information from the base station (S301), and then, based on the received CSI-RS configuration information, receives CSI-RS through at least one node (S302). That is, the terminal receives the CSI-RS through at least one node in one subframe or in multiple subframes.

Thereafter, the terminal performs channel measurement on at least one node using the CSI-RS transmitted through at least one node (S303). Here, at least one node may be serving nodes or candidate nodes of the terminal.

Then, the terminal feeds at least one of channel state information (CSI) and node information back to the base station (S304).

Here, the channel state information (CSI) may be CQI, PMI, RI or SINR. Further, the node information includes at least one of cell ID, antenna port information, CSI-RS configuration, CSI-RS subframe configuration, CSI for node, and node index.

When supporting the distributed multi-node system, the terminal receives CSI-RS for the following node or antenna from the base station.

1. Cell-Specific Antenna (Node)

(1) antennas positioned at the same region in the base station (basic antenna information, i.e., cell center antenna information for LTE-A Rel-10 or its previous system)

(2) all antennas (or nodes) installed in the base station or cell (or all antennas not including information (1) above)

2. UE-Specific Antenna (Node)

(1) antenna for a UE-specific node subset selected by base station or terminal according to the measurement 1. Above (2) antenna for serving node of current terminal The terminal performs channel measurement (or estimation) on at least one node (or antenna) through non-zero power CSI-RS transmitted from the base station.

Thereafter, the terminal feeds channel state information (CSI) for the channel measurement back to the base station (eNodeB). At this time, the terminal may feed at least one of CQI, PMI, and RI for all or each of the nodes back to the eNodeB.

Further, the terminal may feed back to the base station node information including at least one of cell ID, antenna port information, CSI-RS configuration, CSI-RS subframe configuration, CSI for node, and node index based on CSI.

As an example, upon feeding CSI for node (or antenna) back to the base station, in case the terminal has high mobility, the terminal performs estimation and CSI feedback on 1. (1) above.

As an example, to reduce feedback overhead to the base station, the terminal performs CSI estimation on 2. (1) above and CSI feedback thereof at a long term, and performs CSI estimation on 2. (2) above and CSI feedback thereof at a short term.

As an example, the terminal feeds back to the base station node information (at least one of node ID, cell ID, antenna port, CSI-RS configuration, CSI-RS subframe configuration, and CSI for node) for CSI-RSs distinguished from each other by the CSI-RS type indicator or by applying a sequence for a node identifier or cell identifier separate from CSI-RS for CSI feedback.

Further, when feeding back to the base station CSI and/or node information, the terminal may perform such feedback through one of the following schemes.

First, with respect to CSI-RS having a number of CSI-RS configurations,

CSI and/or node information is fed back for all or each of the bands.

Second, with respect to CSI-RS having a number of subframe configurations,

Synthesized CIS and/or node information for nodes known thus far based on the first subframe or for each of channel-measured nodes is fed back to the base station.

As an example of the second case above, assume that CSI-RS for all 16 nodes is transmitted through all two subframes (8 nodes for each).

The terminal may feed back to the base station each CSI and node information for first eight nodes, and may also feed back to the base station CSI and/or node information for each combination of the nodes with respect to 8 nodes.

After receiving the second CSI-RS subframe, the terminal may perform feedback on the CSI and/or node information on each of the remaining 8 nodes.

Further, the terminal may feed back to the base station CSI and/or node information on the rest except for the combination of nodes already obtained in the first subframe among combinations of all of the 16 nodes.

The above-described feedback of CSI and/or node information by the terminal may be performed over all or each of the bands or over the best band.

RSSI, RSRP, RSRQ Measurement Using CSI-RS

Hereinafter, the terminal's performing measurement on, e.g., RSSI, RSRP, and RSRQ, through CSI-RS in the distributed multi-node system and node selection (or detection) through it or others will be described.

In the distributed multi-node system, the base station may transmit CSI-RS to the terminal so that the terminal may perform measurement on RSSI, RSRP, and RSRQ for each node.

In such case, the terminal feeds back to the base station node information (node index, node configuration, cell ID, antenna port) detected (or selected) using RSSI (Reference Signal Strength Indication(Indicator)), RSRP (Reference Signal Received Power), RSRQ (Reference Signal Received Quality) measured through CSI-RS on some or all of the nodes in the cell. That is, in the distributed multi-node system, the terminal may feed back to the base station information relating to node selection by measuring RSRP, RSRQ and RSSI using CSI-RS.

Here, in case the terminal may perform measurement on RSSI, RSRP, and RSRQ for each node through CSI-RS, RSSI, RSRP, and RSRQ may be defined as CSI-RSSI, CSI-RSRP, and CSI-RSRQ, respectively.

Hereinafter, definition of each of CSI-RSSI, CSI-RSRP, and CSI-RSRQ is briefly described.

First, CSI-RSRP (Channel State Information Reference Signal Received Power) is defined as the linear mean for power contribution of resource elements that transmit CSI-RSs in a considered measurement frequency band. CSI-RSRP mapped per node is used to determine CSI-RSRP per node.

Further, the reference point for the CSI-RSRP may be an antenna connector of the terminal.

In case the terminal uses reception diversity, the reported value is not lower than the corresponding CSI-RSRP of a specific area among diversity areas (branches).

Next, CSI-RSRQ (Channel State Information Reference Signal Received Quality) is defined as a ratio of N*CSI-RSRP/E-UTRA carrier CSI-RSSI. Here, N means the number of resource blocks of E-UTRA carrier CSI-RSSI measurement bandwidth.

The values corresponding to the numerator and the denominator, respectively, are measured on the same set of resource blocks.

Then, E-UTRA carrier CSI-RSSI (Channel State Information Reference Signal Strength Indication) is constituted of a linear mean of entire reception power observed only from OFDM symbols including CSI-RS in the measurement bandwidth.

Likewise, the reference point for CSI-RSRQ may be an antenna connector of the terminal.

Further, in case the terminal uses reception diversity, the reported value is not lower than the corresponding CSI-RSRQ of a specific area among diversity areas.

As described above, in case in the distributed multi-node system the terminal receives CSI-RS through at least one node to perform measurement on RSSI, RSRP, and RSRQ, the terminal may feed back to the base station information (node index, node configurations, cell ID, antenna port, etc.) relating to node detection and/or node selection for at least one node. The feedback of the information on the node detection and/or node selection for at least one node may be performed at a long term compared with CSI-RS transmission of the base station for CSI feedback.

Further, the base station may cell-specifically or UE-specifically transmit information for node detection and/or node selection of at least one node of the terminal to the terminal. Here, the base station may configure CSI-RS for node detection and/or selection separately from CSI-RS for CSI-RS feedback and may transmit it to the terminal so that the terminal may perform node detection and/or selection on at least one of the following types of node information:

1. Cell Specific Antenna (Node) Information (Initial Access Information)

(1) information on antennas positioned at the same area in the base station (or basic antenna information on the existing system (LTE-A Rel-10 or its previous system), i.e., cell center antenna information)

(2) information on all of the antennas installed in the base station or cell (or information on all the antennas not including information 1. (1) above)

2. UE-Specific Antenna (Node) Information (1) antenna for a UE-specific node subset selected by the base station or terminal according to the measurement of 1. Above (2) antenna for a serving node of the current terminal The information of 1. (1) above is transmitted to the terminal through PBCH and PDCCH.

The information of 1. (2) above may be transmitted to the terminal using at least one of the following schemes.

First, the terminal is signaled through SIBx.

Here, SIBx means the modified SIB2 and corresponds to a new SIB for the distributed multi-node system.

Finally, it may be implicitly transmitted to the terminal through CSI-RS configuration or CSI-RS subframe configuration information.

The base station may provide a separate CSI-RS to the terminal for nodes of 1. Above. For this purpose, the base station separately signals the terminal with the cell-specific CSI-RS control information separate from the control information for CSI-RS.

At this time, CSI-RSs for 1. (1) and 1. (2) above may be transmitted to the terminal independently from each other. That is, CSI-RS related control information for 1. (1) and 1. (2) above is independently configured and transmitted to the terminal.

Accordingly, the terminal may obtain information on noticeable nodes in the cell through CSI-RS measurement, and node information thereon may be fed back to the base station.

The information of 2. (1) above is determined by the base station based on the UE feedback for all the nodes in the cell, or may be determined by the terminal and may be then transmitted to the base station.

For the operation for node detection/selection and to reduce CSI feedback overhead, the base station may transmit CSI-RS for UE-specific node subset to the terminal separate from CSI-RS for 1. Above and/or CSI-RS for CSI feedback.

That is, the base station UE-specifically transmits separate signaling for transmission of CSI-RS on 2. (1) above. The terminal may obtain information on peripheral nodes through CSI-RS measurement and may feed node information thereon back to the eNodeB.

The base station may determine nodes of 2. (2) (e.g., serving node) based on the corresponding information.

That is, the base station allows the terminal to obtain information on all the nodes in the cell by transmitting control information independent from CSI-RS for CSI feedback to the terminal when transmitting CSI-RS related parameters.

Accordingly, the base station transmits to the terminal at least one of the following types of information so as to transmit CSI-RS for detection and/or selection of the node (or antenna) separate from the CSI-RS for CSI channel estimation:

1) Number of CSI-RS ports
2) Number of CSI-RS Configurations
3) CSI-RS subframe configuration: $I_{CSI-RS}$)
4) Subframe configuration period: $T_{CSI-RS}$
5) Subframe offset: $\Delta_{CSI-RS}$
6) Ratio of PDSCH EPRE to CSI-RS EPRE: $P_c$
7) Zero power CSI-RS configuration
8) Number of available multiple eCSI-RS configurations)
9) CSI-RS identifier The base station assigns a sequence based on a (virtual) cell ID separate from CSI-RS for CSI feedback.

Node Information Feedback to Base Station

Further, the terminal feeds back to the base station at least one of cell ID, antenna port information, CSI-RS configuration, and CSI-RS subframe configuration with respect to CSI-RS measurement.

That is, in the case of being able to perform measurement on, e.g., RSSI, RSRP, and RSRQ through CSI-RS, the terminal feeds back to the base station at least one of the following types of information as a result of the channel measurement.

1. Cell ID (or Node ID)

In case each node is mapped to each CSI-RS configuration and a separate cell ID (or node ID) is assigned to each node, the terminal feeds back cell ID (or node ID) as node information.

2. Antenna Port

Here, the antenna port is transmitted in one of the following forms:

First, logical indexes sorted in order targeting all nodes in the cell.

Second, logical index ordered targeting all nodes that transmit CSI-RS.

Finally, actual port number.

In case each node is mapped to each CSI-RS RE, and a separate cell ID (or node ID) is assigned to each node, the terminal feeds back antenna port information as well as cell ID (or node ID), thereby allowing the base station to obtain node information for the terminal.

3. CSI-RS Configuration

Here, the CSI-RS configuration is transmitted in one of the following forms:

First, concatenated index for a single configuration.

Second, bitmap for all configurations.

Here, as the bitmap, a bitmap based on 1 and 2 ports CSI-RS configuration (e.g., 32 bits bitmap), a bitmap based on 4 ports CSI-RS configuration (e.g., 16 bits bitmap), or a separate bitmap according to the number of CSI-RS ports is transmitted. In other words, in case each node is mapped to each CSI-RS configuration, the terminal feeds back bitmap information or index for CSI-RS configuration and the base station may obtain node information through it.

4. CSI-RS Subframe Configuration

In case each node is mapped to each CSI-RS configuration and CSI-RS for each node is transmitted through a different subframe configuration, the terminal performs feedback on the CSI-RS subframe configuration, and the base station may obtain node information through it.

The intra-cell CSI-RS refers to a CSI-RS to which separate PCI is not signaled in the same CSI-RS or cell having the same PCI (Physical Cell Identifier).

Further, the node may be replaced with at least one of cell, antenna, (e)NodeB, and base station. Further, the nodes are locally positioned sufficiently apart from each other or each has an independent channel. That is, they each have their own coverage.

Second Embodiment

Hereinafter, as anther embodiment suggested herein, a method of transmitting control information for selecting (or determining) a valid node (or antenna node) in a distributed multi-node system is described in detail. For consistency, the term "antenna node" is only described hereinafter.

First, a process of transmitting and receiving data between a base station and a terminal in a DMNS (or DAS) is described.

Figure 4:
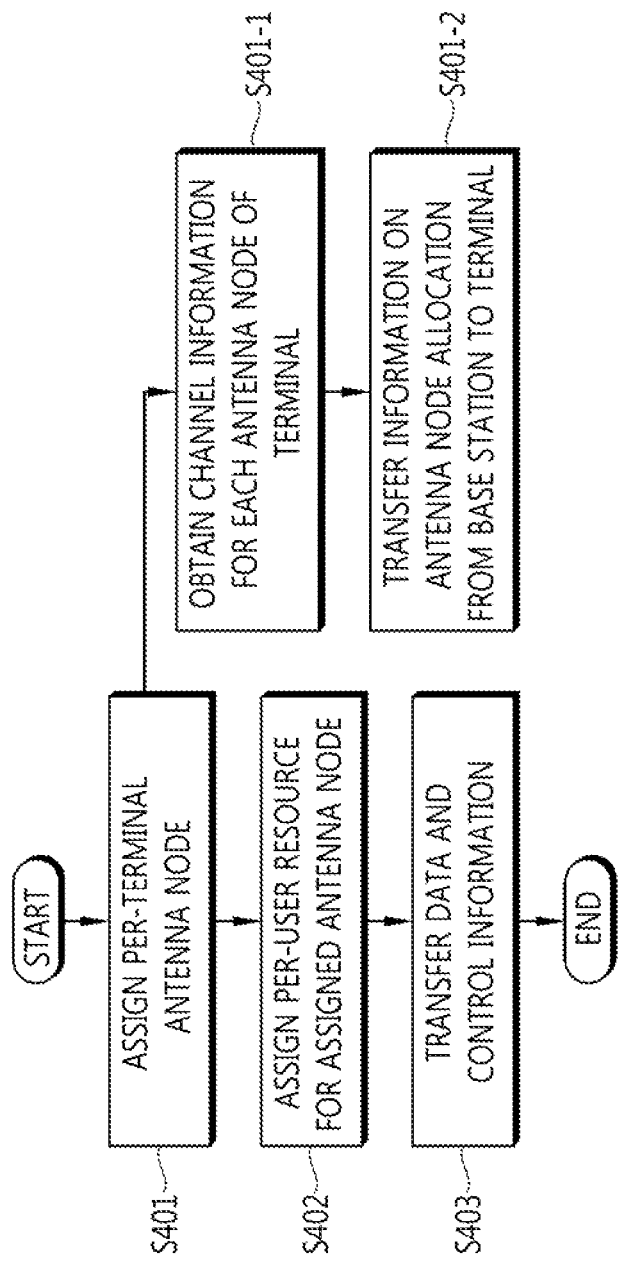
FIG. 4 is a flowchart illustrating a process for data transmission/reception between a base station and a terminal in DMNS.

FIG. 4 is a flowchart illustrating a process for data transmission and reception between a base station and a terminal in a DMNS.

Referring to FIG. 4, the process for data transmission and reception between a base station and a terminal in the DMNS generally includes repetitive steps, such as (1) allocating an antenna node per terminal (S401), (2) allocating a resource per user for the assigned antenna node (S402), and (3) transferring data and control information (S403).

Process (1) of allocating an antenna node per terminal includes 1) step of the terminal obtaining per-node channel information (S401-1) and 2) step of transferring information on antenna node allocation from the base station to the terminal (S401-2).

Further, through process (2), the base station performs resource allocation according to the antenna node selected for each terminal through per-user resource allocation for antenna node assigned to the terminal (S402). Here, the selected antenna nodes may be independent from each other between terminals (i.e., SU-MIMO based) or may be shared to each other (i.e., MU-MIMO based).

Further, through process (3), the base station transmits scheduled data to the terminal over downlink (S403).

Here, the base station may transmit, e.g., midamble, to the terminal so that the terminal may measure downlink channel.

In such case, if the number of antenna nodes transmissible at one midamble symbol time is larger than the number of valid antenna nodes, the base station may transmit the midamble to the terminal by expansion in time domain.

As an example, $m^{th}$ subframe—antenna node (m-1) $P_{midamble} \sim MP_{midamble}$ Here, m $1 \leq m \leq M$, $M = P_{\mathit{eff}}/P_{midamble}$, $P_{\mathit{eff}}$ refers to the number of valid antenna nodes, and $P_{midamble}$ refers to the maximum number of antenna nodes in ne midamble symbol.

Thereafter, the terminal feeds back to the base station control information produced through downlink channel estimation.

Hereinafter, step S401, that is, per-terminal antenna node allocation process, is described in greater detail with reference to FIGS. 5 and 6.

Figure 5:
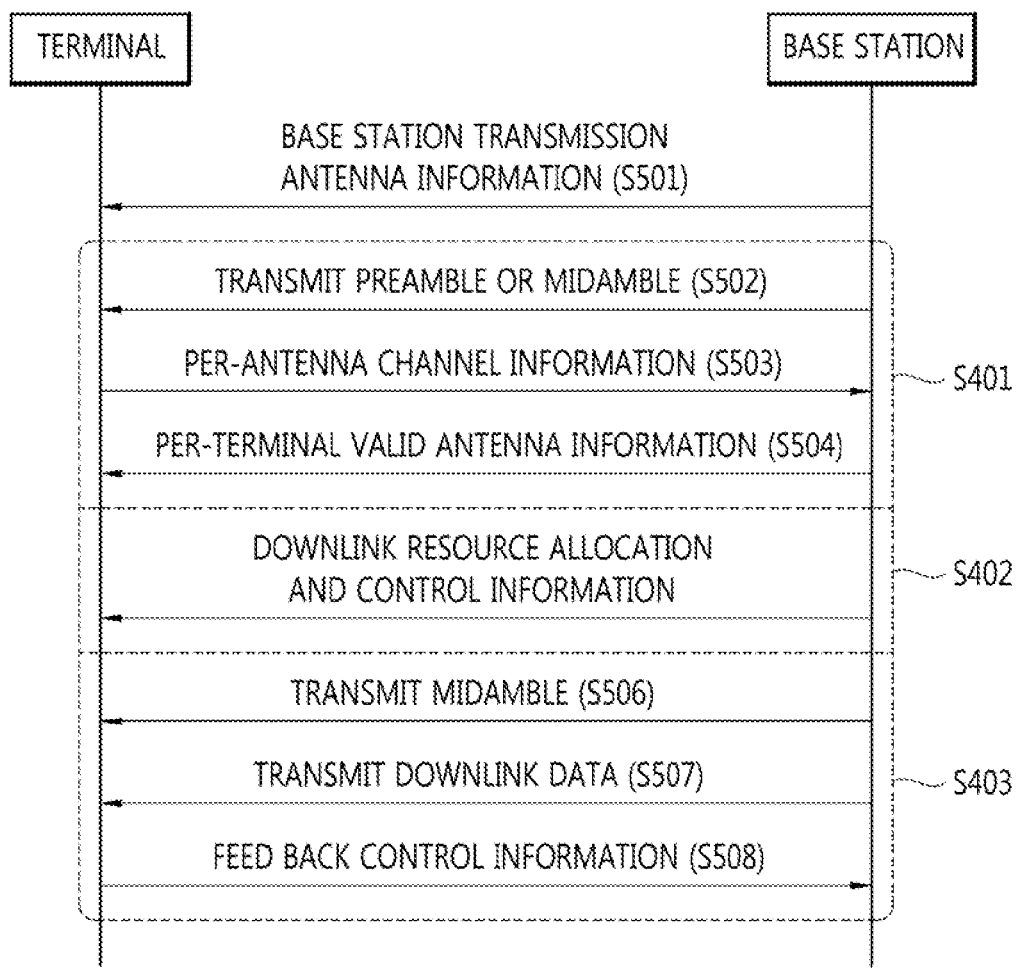
FIG. 5 is a flowchart illustrating a process of selecting a valid antenna node using a downlink channel in DMNS.

FIG. 5 is a flowchart illustrating a process of selecting a valid antenna node using a downlink channel in a DMNS.

Referring to FIG. 5, the terminal obtains per-antenna node (or antenna) channel information through the following process.

First, the terminal receives information on the transmission antenna node from the base station (S501). Then, the terminal measures downlink channel for each base station transmission antenna node (S502). Here, the process of measuring the downlink channel may be performed through the preamble or midamble transmitted from the base station.

Thereafter, the terminal transmits (or feeds back) per-antenna node channel information to the base station (S503).

Here, the terminal may measure downlink channel per base station transmission antenna node and select a favored antenna node, then may feed back the index corresponding to the selected antenna node.

Then, the terminal receives per-terminal valid antenna node information from the base station (S504).

Thereafter, the terminal performs steps S402 and S403 of FIG. 4.

In step S403, i.e., transmission of data and control information, the terminal receives midamble for downlink channel measurement from the base station (S505), receives downlink data from the base station based on the resource allocation information received in step S402 (S506), and feeds the control information back to the base station (S507).

Figure 6:
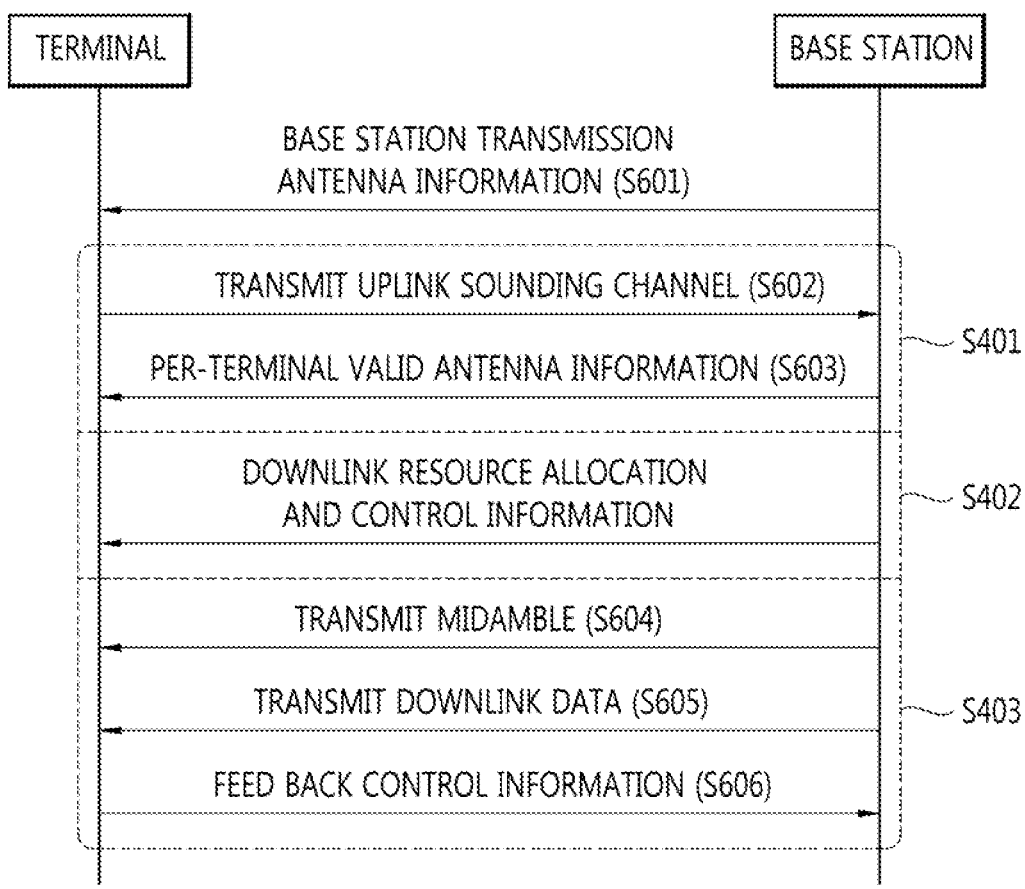
FIG. 6 is a flowchart illustrating a process of selecting a valid antenna node using an uplink channel in DMNS.

FIG. 6 is a flowchart illustrating a process of selecting a valid antenna node using an uplink channel in a DMNS.

Steps S601, S603, and S604 to S606 are the same as steps S501, S504 and S505 to S507 of FIG. 5, and thus, the differences between the two are only described.

Referring to FIG. 6, the terminal transmits sounding channel o the base station over uplink (S602).

The base station selects an appropriate antenna node to assign to the terminal through the received sounding channel. Thereafter, the base station transmits the selected antenna node information to the terminal.

Here, the antenna node selection of the terminal or base station and transmission of the selected antenna node may be performed at a long term.

In general, when the terminal conducts network entry to the base station, the base station notifies its transmission antenna node information (number of transmission antenna nodes).

In the central antenna system (CAS), the number of antenna nodes (or antennas) installed in the base station is the same as the number of base station antenna nodes that may be received by the terminal.

However, in the distributed multi-node system (DAS), the number of antenna nodes installed in the base station may be different from the number of base station antenna nodes that may be received by the terminal. Further, in the general CAS, the number of transmission antennas is small, e.g., 8, but in the case of DAS, the number may be sharply increased due to the install and operation of distributed antennas.

For such reasons, the DAS needs to determine valid antenna nodes receivable with respect to each terminal, and needs to be configured so that upon channel estimation between the base station and terminal, channel estimation on multiple antenna nodes may be possible.

In the process of determining a valid antenna node in the "(1) allocating per-terminal antenna node" of FIG. 4, that is, in the case of selecting an antenna node based on the downlink channel information measured by the terminal, the terminal should feed back to the base station index on the valid antenna node after producing and comparing CQI for the corresponding antenna node or should feed back to the base station the channel information on all the transmission antenna nodes.

In such case, as the number of transmission antenna nodes installed in the base station increases, the quantity of information fed back to the base station and the process of CQI production and comparison are sharply increased, thus imposing a heavy burden on the terminal.

As an example, when configuring the DMNS by adding distributed antennas to a base station having 8Tx in the DMNS, the total number of antenna nodes is drastically increased.

If the base station includes 32 transmission antenna nodes, the following time and frequency resolution may be assumed depending on the number of antenna nodes supportable by Midamble.

(1) In case the number of antenna nodes supportable by midamble is 4Tx, update cycle is 8 subframes or more, and in this case, the frequency resolution is good.

(2) In case the number of antenna nodes supportable by midamble is 8Tx, update cycle is 4 subframes or more, and in this case, frequency resolution is not bad.

(3) In case the number of antenna nodes supportable by midamble is 32Tx, update cycle is 1 subframe or more, and in this case, frequency resolution is bad.

Accordingly, assuming the maximum number of antenna nodes supportable by midamble is 8, time duration of 4 subframes or more is required, and time and overhead in calculation for determining valid antenna for each antenna node are sharply increased. Such overhead increases as the number of antenna nodes increases.

Hereinafter, a method of transmitting control information (e.g., antenna occupation ratio information) for determining valid antenna nodes by the terminal or base station according to a second embodiment of this disclosure is described in detail.

Figure 7:
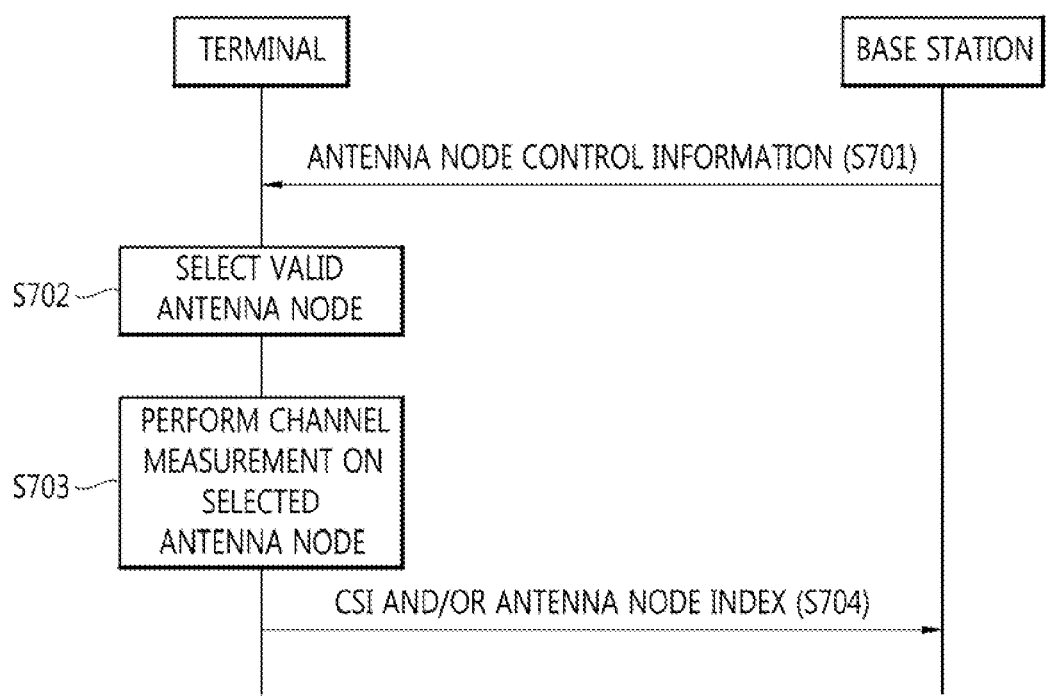
FIG. 7 is a flowchart illustrating transmission of control information according to a second embodiment of this disclosure.

FIG. 7 is a flowchart illustrating control information transmission according to a second embodiment of this disclosure.

That is, FIG. 7 illustrates a process of a terminal selecting a valid antenna node through control information transmitted from a base station.

The terminal receives antenna node control information that includes statistics of use of each antenna node by the base station (S701).

Here, the antenna node control information may include the following information (1) to (5):

(1) Average occupation ratio of antenna or antenna node (Average Antenna Loading/Occupation).

That is, this means a ratio in which the terminal occupies an antenna or antenna node on average during a predetermined period.

(2) Selection weight of antenna or antenna node (Antenna Selection Weight)

That is, this means a probability that the terminal is to select an antenna or an antenna node or a weight corresponding to the probability.

(3) Loading margin of antenna or antenna node (Antenna Loading Margin).

That is, this means a margin of occupation of a current antenna or antenna node respective of the maximum number of terminals shared.

(4) Whether to use an antenna or antenna node (On/Off)

That is, this means whether an antenna or antenna node is being used by the current terminal.

(5) Whether to be able to use antenna or antenna node (On/Off)

The antenna node average occupation ratio may be an index of a predefined lookup table or a value itself in the lookup table.

The following Table 6 shows an example of a lookup table for antenna node average occupation ratios.

TABLE 6

| Index | Antenna(or Antenna Node) Occupation Ratio |
|---|---|
| 0 | Not Used |
| 1 | Low |
| 2 | Medium |
| 3 | High |
| 4 | Very High |

The following Table 7 shows another example of a lookup table for antenna node average occupation ratios.

TABLE 7

| Index | Antenna(or Antenna Node) Occupation Rate (%) |
|---|---|
| 0 | 0~10 |
| 1 | 11~20 |
| 2 | 21~30 |
| 3 | 31~40 |
| 4 | 41~50 |
| 5 | 51~60 |
| 6 | 61~70 |
| 7 | 71~80 |
| 8 | 81~90 |
| 9 | 91~100 |

Referring to Table 7, the antenna node average occupation ratios may have 10 stages.

The following Table 8 shows another example of a lookup table for antenna node average occupation ratios.

TABLE 8

| Index | Antenna(or Antenna Node) Occupation Rate (%) |
|---|---|
| 0 | 0~30 |
| 1 | 31~70 |
| 2 | 71~100 |

Referring to Table 8, the antenna node average occupation ratios may have three stages.

Further, the antenna node control information may be constituted in the form of bitmap.

As an example, in the antenna node control information, among antenna nodes supported by the base station, available antenna nodes may be transmitted to the terminal in the form of bitmap.

For example, assume that 32 physical transmission antenna nodes are installed and used in the base station. The base station may transmit the following information to each terminal.

Transmission of antenna node information available in the specific terminal (as an example, terminal k)

Available antenna node information=
{0,0,1,1,1,0,1,1,1,1,0,0,0,1,1,1,0,1,1,1,1,0,0,0,1,1,1,0, 1,1,1,1}

Transmission of antenna node information available for all the terminals

Available antenna node information=
{0,0,1,1,1,0,1,1,1,1,0,0,0,1,1,1,0,1,1,1,1,0,0,0,1,1,1,0, 1,1,1,1}

Here, the terminal k receives available antenna node information (bitmap) from the base station, estimates the channel with respect to the remaining antenna nodes (set as '1' of the bitmaps) except for antenna nodes 1, 2, 6, 11, 12, 13, 17, 22, 23, 24, and 28 set as '0' of the bitmaps, and feeds the channel estimation result back to the base station. Here, the antenna node information fed back to the base station may include at least one of CQI for each antenna node, receiving SINR and antenna node index information.

Further, the base station may transmit the above antenna node control information to the terminal in the following schemes.

1. Use information on all the physical transmission antennas or antenna nodes is transmitted to the terminal. In such case, the use information on all the physical transmission antennas or antenna nodes may be periodically or non-periodically transmitted to the terminal upon network entry. Further, the periodic transmission may be performed at a very long interval, and the non-periodic transmission may be performed by even-driven or user demand.

2. The use information on the assigned valid transmission antenna or antenna node is transmitted to the terminal. In this case, the use information is also transmitted to the terminal periodically or non-periodically.

Thereafter, the terminal selects a favored (or highly likely to be selected or valid) antenna node based on the received antenna node control information (S702).

Then, the terminal performs channel measurement on the selected antenna node (S703) and transmits (feeds back) channel state information on the selected antenna node or information of the selected antenna node to the base station (S704).

Here, the channel state information (CSI) may be CQI, PMI, RI or SINR. Further, the node information includes at least one of cell ID, antenna port information, CSI-RS configuration, CSI-RS subframe configuration, CSI for node and node index.

Here, the antenna node control information may be commonly transmitted to all the terminals or may be transmitted to each terminal.

Further, in another embodiment of this disclosure, the base station may determine a valid antenna node for all the terminals or for each terminal based on the antenna node control information and may transmit to the terminal information on valid antenna node combinations or for each valid antenna node for the determined valid antenna node. In such case, the terminal may perform channel measurement on the determined valid antenna node and may feed the channel state information back to the base station.

Further, in still another embodiment of this disclosure, the process of the terminal measuring the channel for transmission antenna node is performed on all the antenna nodes installed in the base station when the valid antenna node is initialized or reset like network entry. Further, 2) in the case of update of the valid antenna node having a short time interval, the process may be conducted on only the valid antenna node initially selected.

Figure 8:
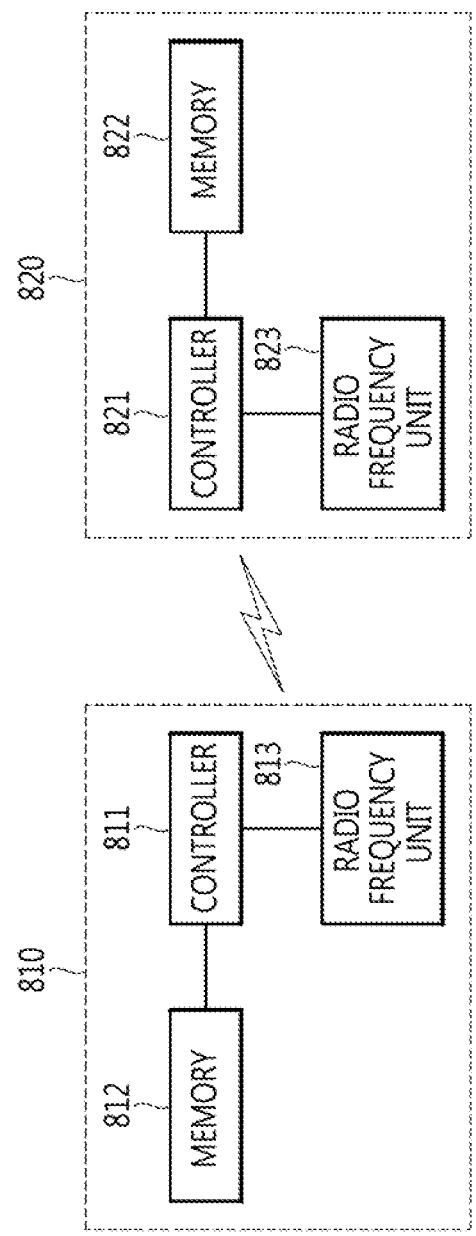
FIG. 8 is a block diagram illustrating a terminal and a base station according to an embodiment of this disclosure.

FIG. 8 is a block diagram illustrating a terminal and a base station according to an embodiment of this disclosure. The base station 810 includes a controller 811, a memory 812, and a radio frequency (RF) unit 813. The controller 811 implements the suggested functions, processes, and/or methods. The layers of the radio interface protocol may be implemented by the controller 811. The controller 811 is configured to perform the operations according to the embodiments disclosed herein with reference to the drawings.

The memory 812 is connected to the controller 811 and stores protocols or parameters for operating the distributed multi-node system.

The radio frequency (RF) unit 813 is connected to the controller 811 and transmits and/or receives radio signals. The terminal 820 includes a controller 821, a memory 822, and a radio frequency (RF) unit 823.

The controller 821 implements the suggested functions, processes, and/or methods. The layers of the radio interface protocol may be implemented by the controller 821. The controller 821 is configured to perform the operations according to the embodiments disclosed herein with reference to the drawings.

The memory 822 is connected to the controller 821 and stores protocols or parameters for operating the distributed multi-node system. The radio frequency (RF) unit 823 is connected to the controller 821 and transmits and/or receives radio signals.

The controller 811 or 821 may include an ASIC (Application-Specific Integrated Circuit), other chipsets, a logical circuit and/or a data processing device. The memory 812 or 822 may include a ROM (Read-Only Memory), a RAM (Random Access Memory), a flash memory, a memory card, a storage medium and/or other storage devices. The radio frequency (RF) unit 813 or 823 may include a baseband circuit for processing radio signals. When the embodiments are implemented in software, the above-described schemes may be implemented in modules (processes or functions) that perform the above-described functions. The modules may be stored in the memory 812 or 822 or may be executed by the controller 811 or 821. The memory 812 or 822 may be positioned in or outside the controller 811 or 821 and may be connected to the controller 811 or 821 via various known means.

Although the embodiments of the present invention have been described thus far, the scope of the present invention is not limited to the specific embodiments, and rather various modifications or variations may be made without departing from the scope of the present invention defined by the appending claims.

The invention claimed is:

1. A method for receiving a reference signal (RS) in a distributed multi-node system, the method comprising:
receiving channel state information reference signal (CSI-RS) configuration information from a base station, wherein the CSI-RS configuration information indicates a non-zero power configuration of a CSI-RS; and receiving a non-zero power CSI-RS on at least one node in a cell based on the CSI-RS configuration information,
wherein the non-zero power CSI-RS has multiple configurations and is received within a single subframe,
wherein, if the non-zero power CSI-RS is received through at least two subframes, the non-zero power CSI-RS is received at a predetermined frame offset interval or at an integer-multiple duty cycle interval based on the received single subframe.

2. The method of claim 1, further comprising receiving from the base station CSI-RS type indication information that indicates whether the CSI-RS is for channel state information (CSI) feedback or for node information feedback.

3. The method of claim 2, wherein node distinction using the CSI-RS is performed by additionally using node distinction information upon generation of a CSI-RS sequence, wherein the node distinction information includes a node index, a port number or a virtual cell ID.

4. The method of claim 3, wherein the CSI-RS sequence uses different sets depending on a purpose of the CSI-RS.

5. The method of claim 2, further comprising in a case where the CSI-RS is for the CSI feedback:
performing channel measurement on the at least one node through the received CSI-RS; and
feeding back to the base station the CSI-RS on the at least one node.

6. The method of claim 2, further comprising in a case where the CSI-RS is for the node information feedback;
performing measurement on RSSI (Reference Signal Strength Indication(Indicator)), RSRP (Reference Signal Received Power), or RSRQ (Reference Signal Received Quality) through the received CSI-RS; and
feeding back to the base station node information for selecting the at least one node.

7. The method of claim 6, wherein the channel state information or the node information is fed back for all or each of frequency bands.

8. The method of claim 6, wherein the channel state information or the node information is fed back for each or a combination of the at least one node.

9. The method of claim 6, wherein the node information includes at least one of a cell ID, antenna port information, a CSI-RS configuration, a CSI-RS subframe configuration, node configuration information, CSI for a node, or a node index.

10. The method of claim 1, wherein the CSI-RS configuration information includes information on a maximum number of configurations that may be owned by the CSI-RS in one subframe.

11. The method of claim 10, wherein the information on the maximum number of the configurations is determined by at least one of an antenna port, a cyclic prefix (CP) type, or a frame structure type.

12. The method of claim 1, wherein the CSI-RS configuration information includes UE-specific CSI-RS port mapping information.

13. The method of claim 1, further comprising receiving from the base station CSI-RS resource element power information that is defined as a ratio of per-PDSCH resource element energy (EPRE) to per-CSI-RS resource element energy (EPRE), wherein the CSI-RS resource element power information is a UE-specific value.

14. A terminal for performing channel measurement using a reference signal (RS) in a distributed multi-node system, the terminal comprising:
a radio frequency unit for transmitting and receiving a radio signal to/from an outside; and
a controller connected to the radio frequency unit and configured to:
control the radio frequency unit so that channel state information reference signal (CSI-RS) configuration information is received from a base station, wherein the CSI-RS configuration information indicates a non-zero power configuration of a CSI-RS; and
control the radio frequency unit so that based on the CSI-RS configuration information, a non-zero power CSI-RS for at least one node in a cell is received, wherein the non-zero power CSI-RS has multiple configurations, and is received within a single subframe,
wherein, if the non-zero power CSI-RS is received through at least two subframes, the non-zero power CSI-RS is received at a predetermined frame offset interval or at an integer-multiple duty cycle interval based on the received single subframe.

* * * * *